July 8, 1969  J. STRANGE  3,454,071
SHEET METAL FASTENER

Filed Aug. 23, 1967   Sheet _1_ of 2

INVENTOR.

BY JOHN STRANGE

Teare, Teare & Sammon
ATTORNEYS

July 8, 1969  J. STRANGE  3,454,071

SHEET METAL FASTENER

Filed Aug. 23, 1967  Sheet 2 of 2

INVENTOR.

BY JOHN STRANGE

Teare, Teare & Sammon
ATTORNEYS

United States Patent Office 3,454,071
Patented July 8, 1969

3,454,071
SHEET METAL FASTENER
John Strange, Llanishen, Wales, assignor to Tinnerman Products, Inc., Cleveland, Ohio, a corporation of Ohio
Filed Aug. 23, 1967, Ser. No. 662,672
Int. Cl. F16b 39/00
U.S. Cl. 151—41.75                                                                 10 Claims

ABSTRACT OF THE DISCLOSURE

A sheet metal fastener having an elongated slot extending in the same general direction as the fastener and forming side portions and end or bridge portions. Opposing fingers extend inwardly from the side portions and are shaped at their ends for engaging the thread of the bolt and exerting spring tension thereon when the bolt is tightened. At least one of the end or bridge portions is arched out of the plane of the fastener and cooperates with the fingers to exert additional spring tension on the bolt. The foregoing features may be incorporated in fasteners having various shapes.

BACKGROUND OF THE INVENTION

Field of the invention

The present invention relates to fasteners of the type designed to be used in conjunction with bolts, screws or threaded rods for fastening to a part, such as a panel or block, or for securing a plurality of such parts together.

Description of the prior art

It has previously been proposed to employ fasteners which are made of sheet metal and are designed to cooperate with the bolt to effect a tight locking engagement with the part when the bolt is tighened. Such previously proposed fasteners have proved generally satisfactory for most applications but difficulties have been experienced in keeping the fastener properly engaged with the bolt when, for some reason, the surfaces of the fastener and part to be secured become separated, or when the fastener has to be repeatedly reused.

SUMMARY OF THE INVENTION

The invention is illustrated in a fastener which is formed from a single strip of resilient sheet metal, such as spring steel, and which in one form is bent intermediately to provide two arms which are adapted to receive a part to be joined. One of the arms, designated the upper arm, has opposed bolt engaging fingers, or tongues, and bridge portions, while the other or lower arm has a bolt locating opening through which a bolt may be inserted to secure the part and fastener together without requiring access to the remote side of the fastener. The upper arm also has a slot which extends in the same general direction as the arm and has an intermediate region constituting a bolt receiving opening defined in part by two opposed tongues shaped to engage the thread of the bolt, while the parts of the slot remote from the bolt receiving opening terminate at end or bridge portions. At least one of the bridge portions is arched out of the general plane of the fastener, so as to constitute resilient take-up means adapted to bias the tongues in engagement with the bolt entering the bolt receiving opening, while allowing the tongues to separate sufficiently to accommodate the bolt, whereby the bolt may be turned relative to the fastener to bring the fastener into tight engagement with the part to be secured. The fastener then exerts a prevailing torque on the bolt to resist detachment therefrom, if engagement between the fastener and the part becomes loosened. An object of the invention is to provide a fastener which resists disengagement from a cooperating bolt, even when the fastener is not screwed tightly against a part. It is a further object to provide a fastener which is capable of repeated reuse without substantial change in its original dimensions.

DESCRIPTION OF THE PREFERRED EMBODIMENTS

Figure 1:
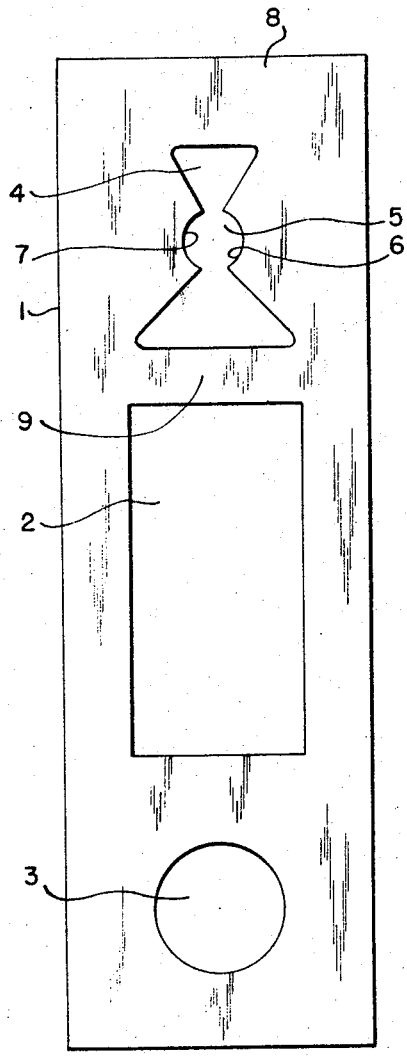
FIG. 1 is a top plan view of a blank from which one embodiment of the invention is made.

Similar parts of the fasteners are given the same reference numerals throughout the several figures.

Referring now to FIG. 1 of the drawings, the blank 1 consists of a single strip of spring steel. Apertures 2, 3 and 4 are punched in this strip, and of these the central aperture 2 is generally rectangular in form while aperture 3 is circular. Aperture 4 is in the form of an irregularly shaped slot whose intermediate region 5 is designed in the finished fastener to constitute a bolt-receiving opening 5 at first diverge and then terminate at fastener bridge portions 8 and 9.

Figure 2:
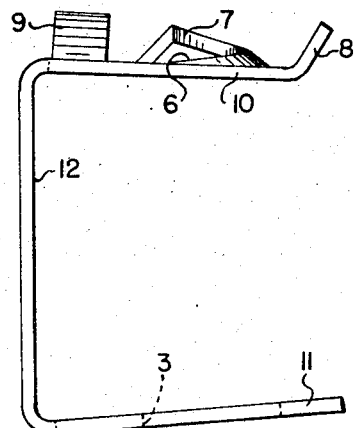
FIG. 2 is a side elevational view of the first embodiment of the fastener.
Figure 4:
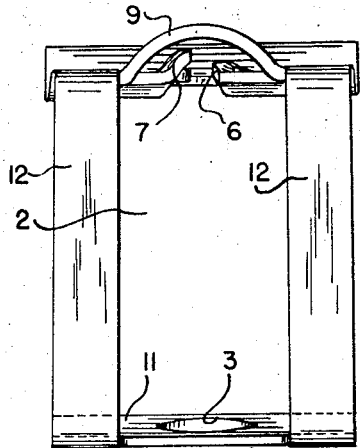
FIGS. 3 and 4 are top plan and end elevational views, respectively, of the fasteners shown in FIG. 2.
Figure 3:
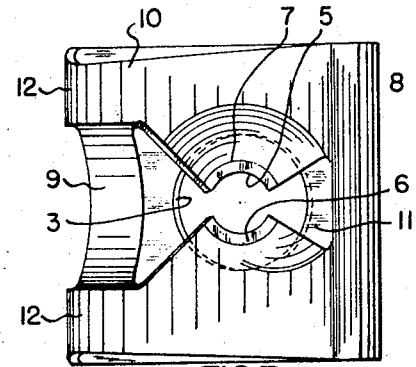
Figure 5:
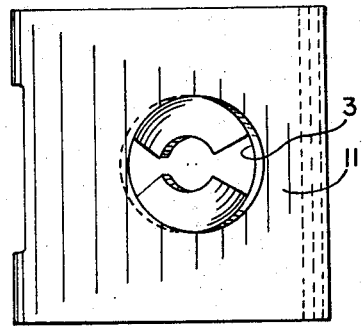
FIG. 5 is a bottom plan view of the fastener shown in FIG. 2.
Figure 7:
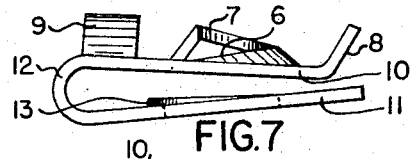
FIG. 7 is a side elevational view of the second embodiment.
Figure 9:
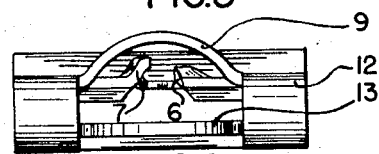
FIGS. 8, 9 and 10 are top plan, end and bottom plan views, respectfully, of the fastener shown in FIG. 7.
Figure 8:
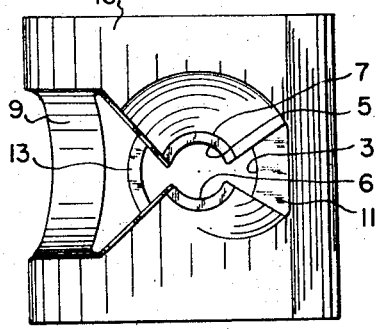
Figure 10:
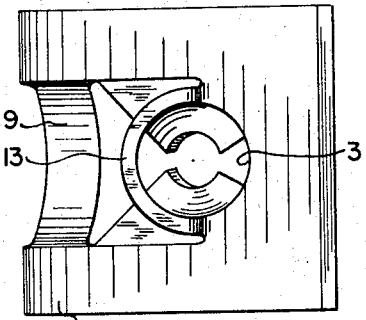

As depicted in FIGS. 2 to 5, the finished fastener is shaped from the blank 1 by first upsetting the tongues 6 and 7 so that their edges conform to the helix of the thread on the bolt with which the fastener is intended to be used. That is to say, the edges of tongues 6 and 7 follow an interrupted helical path such that a cooperating bolt can be threaded through the bolt-receiving opening 5 while engaging the tongues. Next, the bridge portion 9 is arched out of the general plane of the steel strip in the region of the tongues, as illustrated in FIGS. 2 to 4. At the same time, bridge portion 8 is curved up into a lip. Finally, the metal strip is bent transversely, at positions approximately corresponding to the ends of aperture 2, so as to be substantially U-shaped with an upper arm 10, a lower arm 11, and a straight bifurcated connecting or bight portion 12.

The embodiment of FIGS. 2 to 5 is designed to be used with an article such as a wooden panel or block to be joined, the panel being inserted between the arms 10 and 11 so as to abut the bight portion 12. It will be seen that the arms converge away from the bight portion 12, so as to exert a clip action on the panel, and that the curved-up lip formed by the bridge portion 8 at the free end of upper arm 10 facilitates entry of the panel. The axes of aperture 3 and bolt-receiving opening 5 are generally in alignment and run parallel to the straight bight portion 12, so that the panel can be inserted between the arms 10 and 11 and a bolt-receiving bore in the panel subsequently positioned opposite aperture 3, whereupon a bolt can be inserted through this aperture and through the panel to engage with the tongues of opening 5 without requiring access to the remote arm 10 of the fastener.

Referring particularly to FIG. 3, it will be seen that the two bridge portions 8 and 9 serve in effect to connect together the tongues 6 and 7 which engage the thread of a cooperating bolt. The bridge portion 9 is arched or bowed out of the plane of the upper arm 10 of the metal strip, which incorporates the tongues 6 and 7 as well as the bridge portions and the bolt-receiving opening 5. In the finished fastener, the arched bridge portion 9 constitutes resilient take-up means whose function is to bias the tongues 6 and 7 into engagement with a bolt entering the opening 5 while permitting sufficient expansion of the tongues, which have been previously forced somewhat towards each other by the arching of bridge portion 9, to accommodate passage of the bolt through the bolt-receiving orifice. In other words, the arching of bridge portion 9 causes the tongues 6 and 7 to exert a prevailing torque on the bolt which is additional to the locking torque normally exerted when the bolt is tightened to bring the upper arm 10 of the fastener down hard against the corresponding face of the part to be secured.

The importance of this additional prevailing torque can be illustrated by an example. As mentioned above, fasteners of the kind illustrated in FIGS. 1 to 5 may be used in conjunction with a wooden panel or strip; after a considerable period in storage or in use, the wood may be subject to shrinkage. For the sake of comparison, assuming that such a wooden panel has been inserted between the arms 10 and 11 of a fastener similar to that shown in FIGS. 2 to 5 but in which the bridge portion 9 has not been arched, then as a cooperating bolt is inserted through aperture 3 and a corresponding bore in the wood panel, it will come to engage the tongues 6 and 7 of upper arm 10 and will turn easily in screw-threaded engagement with the tongues without any prevailing torque being exerted on the bolt. As the bolt is tightened, arm 10 is brought into close engagement with the corresponding face of the panel and at the same time the raised portions of tongues 6 and 7 are drawn down by the bolt thread so as to grip the thread increasingly tightly. When the bolt is finally tightened on first installation, therefore, there is a good locking torque and this locking torque does not change materially providing the fastener is kept in tight engagement with the panel. Upon subsequent contraction of the wooden panel, however, the necessary tight engagement with the fastener may cease to exist and so the locking torque may be loosened or released altogether. In extreme cases, due to the effect of vibration or shock, there may be nothing to prevent the bolt gradually turning itself loose from the tongues 6 and 7 and the various parts becoming completely detached from each other. By bowing the bridge portion 9, on the other hand, the tongues 6 and 7 are biased inwardly so as to establish the prevailing torque on the bolt at first insertion, before the bolt is tightened and the tongues deflect downwardly to provide the normal locking torque. This prevailing torque exists all the time to positively resist unscrewing of the bolt from the fastener, even if the wooden panel shrinks and the locking torque is released altogether.

The invention is not restricted to U-type fasteners or to fasteners designed to be used in conjunction with parts made of wood or similar material liable to shrinkage. If the part or parts to be secured are made of metal, for example, it may still be advantageous to use fasteners made in accordance with the present invention, particularly when the fasteners are intended to be reused. Our previous experience with sheet metal fasteners having thread-engaging tongues has shown that the dimensions of the fasteners always tend to increase slightly after the fasteners are released subsequent to bolt insertion. With the present fasteners, however, we have found that the original dimensions may be almost entirely regained when the fastener is removed for reuse.

Figure 6:
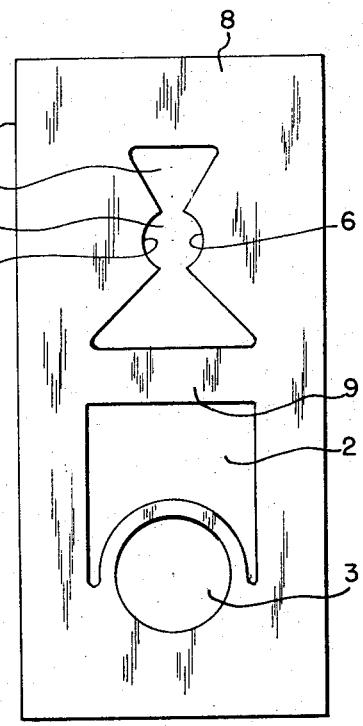
FIG. 6 is a view corresponding to FIG. 1 of the blank used in making a second embodiment of the fastener.

FIGS. 6 to 10 illustrate a fastener similar in many respects to that shown in FIGS. 1 to 5 but intended for use with somewhat thinner parts made, for example, of metal. The construction and mode of operation of this fastener will be readily apparent in view of the description already given. Comparing the blank shown in FIG. 6 with the corresponding blank of the first embodiment illustrated in FIG. 1, it will be seen that three apertures 2, 3 and 4 are once again provided in the spring steel strip and the aperture 4 in particular is practically identical with that previously described. Intermediate region 5 of this aperture 4 once again constitutes a bolt-receiving opening defined in part by tongues 6 and 7 which are subsequently shaped to conform with the thread of a cooperating bolt in the manner described above. Bridge portions 8 and 9 also correspond. Aperture 2 shown in FIG. 6 differs somewhat in shape from the corresponding aperture in FIG. 1, and is bounded at one end by a part-circular metal band 13 whose opposite edge forms part of the periphery of aperture 3. In fashioning the completed fastener shown in FIGS. 7 to 10, bridge portion 9 is bowed in the manner illustrated particularly clearly in FIG. 9, so as to enable the tongues 6 and 7 to exert a prevailing torque on a cooperating bolt in the manner explained in full with reference to the first embodiment of the fastener. The blank of FIG. 6 is then bent intermediate its ends close to the bridge portion 9 so as to form upper and lower arms 10 and 11 respectively and a relatively narrow bight portion 12. In addition, the metal band 13 is bent upwardly so as to extend initially in a direction at an angle to the plane of the rest of the arm 11, the free end of the band being bent over so as to lie substantially parallel to this plane. Thus bent, the bend 13 constitutes a locating tongue for the fastener.

I claim:

1. A fastener made from a piece of sheet metal adapted for attachment to an apertured support member by means of a threaded member comprising, a pair of spaced, oppositely disposed resilient arms made integral with and extending from an inner connecting bight portion adapted to receive an apertured support member therebetween, one of said arms having an elongated slot disposed generally longitudinally thereof, a pair of laterally spaced tongues struck-out of the material of said one arm adjacent opposed margins of said slot and defining a generally centrally disposed opening adapted for threadably receiving a threaded member therethrough, said tongues being connected together adjacent the end remote from said bight portion by a first transversely extending bridge portion, said bight portion having a generally centrally disposed aperture which defines a bifurcated construction therefor and with said aperture communicating with the slot in said one arm adjacent its juncture with said bight portion, and said tongues being connected together adjacent said juncture by a second transversely extending bridge portion arched outwardly from the general plane of said one arm so as to bridge the slot in said one arm to provide a resilient take-up means adapted to bias said said tongues into engagement with said threaded member inserted through said opening while enabling said tongues to separate sufficiently to accommodate said threaded member, whereby said threaded member and fastener may be turned relative to one another so as to bring the fastener into tight engagement with said support member with the fastener being cooperative to exert a prevailing torque on said threaded member to resist detachment therefrom.

2. A fastener in accordance with claim 1, wherein the slot in said one arm is of an irregular shaped configuration terminating at one end adjacent said first bridge portion and communicating at its opposite end with the aperture in said bifurcated bight portion to be disposed beneath said second bridge portion.

3. A fastener in accordance with claim 2, wherein the opening defined by said tongues is of a generally circular configuration in top plan.

4. A fastener in accordance with claim 2, wherein the slot in said one arm diverges outwardly on opposed sides of the opening defined by said tongues in directions toward the respective bridge portions.

5. A fastener in accordance with claim 1, wherein said tongues are inclined upwardly and inwardly from the general plane of the said one arm to conform generally to the helix of the threads on said threaded member.

6. A fastener in accordance with claim 1, wherein said fastener is of a generally U-shaped configuration with said arms extending convergently outwardly away from said bifurcated bight portion to provide a snap-action locking engagement with said support member.

7. A fastener in accordance with claim 6, wherein said bifurcated bight portion is of an elongated generally flat construction.

8. A fastener in accordance with claim 6, wherein said bifurcated bight portion is of a curved construction.

9. A fastener in accordance with claim 1, wherein said other arm includes an aperture disposed substantially in axial alignment with the opening in said one arm adapted to receive therethrough said threaded member when inserted through said opening.

10. A fastener in accordance with claim 9, wherein the aperture in said other arm is defined adjacent one end by a partial band portion of arcuate configuration, said band portion extending upwardly and outwardly therefrom and generally parallel to the plane of the respective arm in a direction toward its free end to provide a locating tongue for said fastener.

References Cited

UNITED STATES PATENTS

| | | | |
|---|---|---|---|
| 2,170,739 | 8/1939 | Tinnerman | 151—41.75 |
| 2,298,568 | 10/1942 | Kost | 151—41.75 |
| 2,798,406 | 7/1957 | Steck | 85—36 |

EDWARD C. ALLEN, *Primary Examiner.*